(12) United States Patent
Hwang et al.

(10) Patent No.: US 12,259,489 B2
(45) Date of Patent: Mar. 25, 2025

(54) METHOD FOR DETERMINING LOCATION OF V2X DEVICE IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Jaeho Hwang, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 17/790,786

(22) PCT Filed: Jan. 25, 2021

(86) PCT No.: PCT/KR2021/000958
§ 371 (c)(1),
(2) Date: Jul. 5, 2022

(87) PCT Pub. No.: WO2021/150081
PCT Pub. Date: Jul. 29, 2021

(65) Prior Publication Data
US 2023/0051251 A1  Feb. 16, 2023

(30) Foreign Application Priority Data

Jan. 23, 2020 (KR) .................. 10-2020-0009335

(51) Int. Cl.
*G01S 5/12* (2006.01)
*H04W 4/40* (2018.01)
*H04W 64/00* (2009.01)

(52) U.S. Cl.
CPC .................. *G01S 5/12* (2013.01); *H04W 4/40* (2018.02); *H04W 64/003* (2013.01)

(58) Field of Classification Search
CPC .......... G01S 5/12; H04W 4/40; H04W 64/003
See application file for complete search history.

(56) References Cited

U.S. PATENT DOCUMENTS

2015/0303989 A1    10/2015  Mathews et al.

FOREIGN PATENT DOCUMENTS

| EP | 3306337 A1 | 4/2018 |
| KR | 1020170071207 A | 6/2017 |

(Continued)

OTHER PUBLICATIONS

Sibler et al. (DE 102019105662 A1) published Sep. 26, 2019 with English translation (Year: 2019).*

*Primary Examiner* — Nader Bolourchi
(74) *Attorney, Agent, or Firm* — BRYAN CAVE LEIGHTON PAISNER LLP

(57) ABSTRACT

Disclosed are a method and apparatus for determining a position of a Vehicle-to-Everything (V2X) device in a wireless communication system according to various embodiments. Disclosed are a method and apparatus, the method comprising the steps of: receiving a first signal from a first road side unit (RSU) and a second signal from a second RSU through a first antenna and a second antenna distributed over a predetermined distance; measuring a first time difference that is a reception time difference for the first signal and a second time difference that is a reception time difference for the second signal between the first antenna and the second antenna; and determining the position of the V2X device on the basis of the first time difference and the second time difference.

12 Claims, 25 Drawing Sheets

(56) References Cited

FOREIGN PATENT DOCUMENTS

KR     1020190030408 A     3/2019
KR     1020190116453 A     10/2019

\* cited by examiner (a)

(b)

(a)

(b)

(a)

(b)

METHOD FOR DETERMINING LOCATION OF V2X DEVICE IN WIRELESS COMMUNICATION SYSTEM SUPPORTING SIDELINK, AND APPARATUS THEREFOR

This application is the National Stage filing under 35 U.S.C. 371 of International Application No. PCT/KR2021/000958 filed on Jan. 25, 2021, which claims priority to Korean Patent Application No. 10-2020-0009335 filed on Jan. 23, 2020, the contents of which are all hereby incorporated by reference herein in their entirety.

TECHNICAL FIELD

The present disclosure relates to a method of determining a position of a vehicle-to-everything (V2X) device using two road side units (RSUs) by the V2X device in a wireless communication system supporting sidelink, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object to be achieved is to provide a method and apparatus capable of remarkably improving accuracy of positioning measurement using two road side units (RSUs) by measuring the location of a vehicle based on a time difference of arrival of signals received respectively from the two RSUs and accurately matching an intersection of hyperbolas obtained based on the time difference of arrival and a specific location of the vehicle.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

According to an aspect of the present disclosure, provided herein is a method of determining a position of a vehicle-to-everything (V2X) device, including receiving a first signal from a first road side unit (RSU) and a second signal from a second RSU, through a first antenna and a second antenna distributed a predetermined distance apart, measuring a first time difference of arrival (TDoA), which is a difference in reception time of the first signal between the first antenna and the second antenna, and a second TDoA, which is a difference in reception time of the second signal between the first antenna and the second antenna. And determining the position of the V2X device based on the first TDoA and the second TDoA. The V2X device may calculate a first hyperbola based on the first TDoA and a second hyperbola based on the second TDoA and determine a first offset based on the predetermined distance and the first TDoA and a second offset based on the predetermined distance and the second TDoA. The position of the V2X device may be determined based on an intersection of the first hyperbola to which the first offset is applied and the second hyperbola to which the second offset is applied.

Alternatively, the V2X device may calculate a first distance obtained by multiplying a propagation speed by the first TDoA and a second distance obtained by multiplying the propagation speed by the second TDoA. The first offset may be determined based on a first separation distance obtained by subtracting the first distance from the predetermined distance, and the second offset may be determined based on a second separation distance obtained by subtracting the second distance from the predetermined distance.

Alternatively, the first offset may be determined as a value obtained by dividing the first separation distance by 2, based on the first signal being received first at the first antenna among the first antenna and the second antenna and on the position of the V2X device corresponding to a position of the first antenna.

Alternatively, the first offset may be determined as a value obtained by dividing the first separation distance by 2 and then adding the first distance to the divided resultant value, based on the first signal being received first at the second antenna among the first antenna and the second antenna and on the position of the V2X device corresponding to the position of the first antenna.

Alternatively, the first signal may include information about a position of the first RSU, and the second signal may include information about a position of the second RSU.

Alternatively, the method may further include detecting a forward direction of the V2X device through a geomagnetic sensor Alternatively, the first hyperbola may be related to one hyperbola specified by the forward direction among a plurality of hyperbolas calculated based on the first TDoA and the information about the position of the first RSU, and the second hyperbola may be related to one hyperbola specified by the forward direction among a plurality of hyperbolas calculated based on the second TDoA and the information about the position of the second RSU.

Alternatively, the V2X device may measure a position change amount from a first time to a second time using an inertial sensor, based on the second signal being received at the second time after the first signal is received at the first time. The position of the first RSU may be moved by the position change amount, and the first hyperbola may be calculated based on the moved position of the first RSU.

In another aspect of the present disclosure, provided herein is a vehicle-to-everything (V2X) device for determining a position thereof using a first road side unit (RSU) and a second RSU in a wireless communication system supporting sidelink communication, including a first antenna and a second antenna distributed a predetermined distance apart and a processor connected to the first antenna and the second antenna. The processor may control the first antenna and the second antenna to receive a first signal from the first RSU and a second signal from the second RSU and may measure a first time difference of arrival (TDoA), which is a difference in reception time of the first signal between the first antenna and the second antenna, and a second TDoA, which is a difference in reception time of the second signal between the first antenna and the second antenna. The processor may calculate a first hyperbola based on the first TDoA and a second hyperbola based on the second TDoA and determine a first offset based on the predetermined distance and the first TDoA and a second offset based on the predetermined distance and the second TDoA. The position of the V2X device may be determined based on an intersection of the first hyperbola to which the first offset is applied and the second hyperbola to which the second offset is applied.

Alternatively, the processor may calculate a first distance obtained by multiplying a propagation speed by the first TDoA and a second distance obtained by multiplying the propagation speed by the second TDoA. The first offset may be determined based on a first separation distance obtained by subtracting the first distance from the predetermined distance, and the second offset may be determined based on a second separation distance obtained by subtracting the second distance from the predetermined distance.

Alternatively, the first offset may be determined as a value obtained by dividing the first separation distance by 2, based on the first signal being received first at the first antenna among the first antenna and the second antenna and on the position of the V2X device corresponding to a position of the first antenna.

Alternatively, the first offset may be determined as a value obtained by dividing the first separation distance by 2 and then adding the first distance to the divided resultant value, based on the first signal being received first at the second antenna among the first antenna and the second antenna and on the position of the V2X device corresponding to the position of the first antenna.

In another aspect of the present disclosure, provided herein is a chipset for determining a position of a vehicle-to-everything (V2X) device using a first road side unit (RSU) and a second RSU in a wireless communication system supporting sidelink communication, including at least one processor, and at least one memory operatively connected to the at least one processor and configured to cause the at least one processor to perform an operation when executed. The operations may include receiving a first signal from the first RSU and a second signal from the second RSU, through a first antenna and a second antenna distributed a predetermined distance apart, measuring a first time difference of arrival (TDoA), which is a difference in reception time of the first signal between the first antenna and the second antenna, and a second TDoA, which is a difference in reception time of the second signal between the first antenna and the second antenna, calculating a first hyperbola based on the first TDoA and a second hyperbola based on the second TDoA, and determining a first offset based on the predetermined distance and the first TDoA and a second offset based on the predetermined distance and the second TDoA. The position of the V2X device may be determined based on an intersection of the first hyperbola to which the first offset is applied and the second hyperbola to which the second offset is applied.

Alternatively, the processor controls a traveling mode of the V2X device connected to the chipset based on the first offset.

In another aspect of the present disclosure, provided herein is a computer readable storage medium including at least one computer program for causing at least one processor to determine a position of a vehicle-to-everything (V2X) device using a first road side unit (RSU) and a second RSU in a wireless communication system supporting sidelink communication, including the at least one computer program configured to cause the at least one processor to perform operations for determining the position of the V2X device, and the computer readable storage medium storing the at least one computer program. The operations may include receiving a first signal from the first RSU and a second signal from the second RSU, through a first antenna and a second antenna distributed a predetermined distance apart, measuring a first time difference of arrival (TDoA), which is a difference in reception time of the first signal between the first antenna and the second antenna, and a second TDoA, which is a difference in reception time of the second signal between the first antenna and the second antenna, calculating a first hyperbola based on the first TDoA and a second hyperbola based on the second TDoA, and determining a first offset based on the predetermined distance and the first TDoA and a second offset based on the predetermined distance and the second TDoA. The position of the V2X device may be determined based on an intersection of the first hyperbola to which the first offset is applied and the second hyperbola to which the second offset is applied.

Advantageous Effects

According to various embodiments, accuracy of positioning measurement using two RSUs may be remarkably improved by measuring the location of a vehicle based on a time difference of arrival of signals received respectively from the two RSUs and accurately matching an intersection of hyperbolas obtained based on the time difference of arrival and a specific location of the vehicle.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
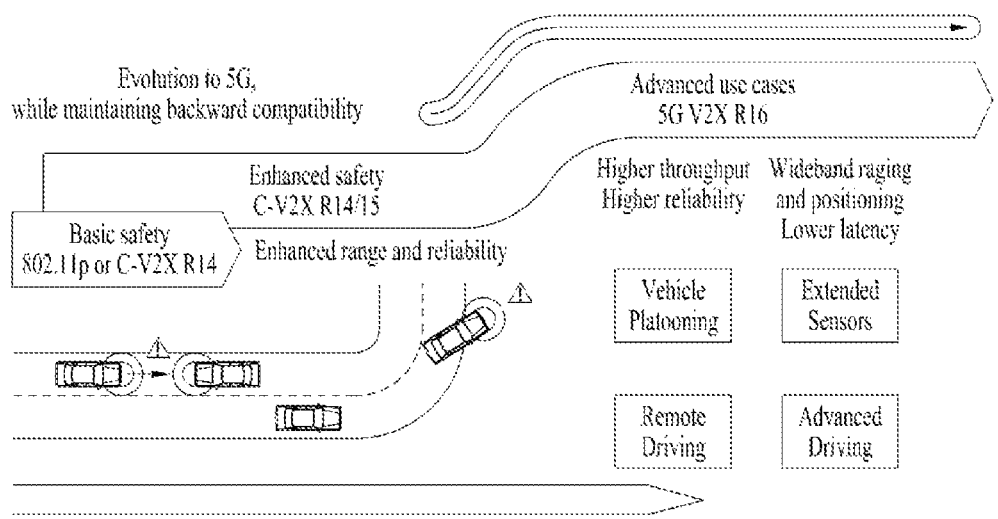
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
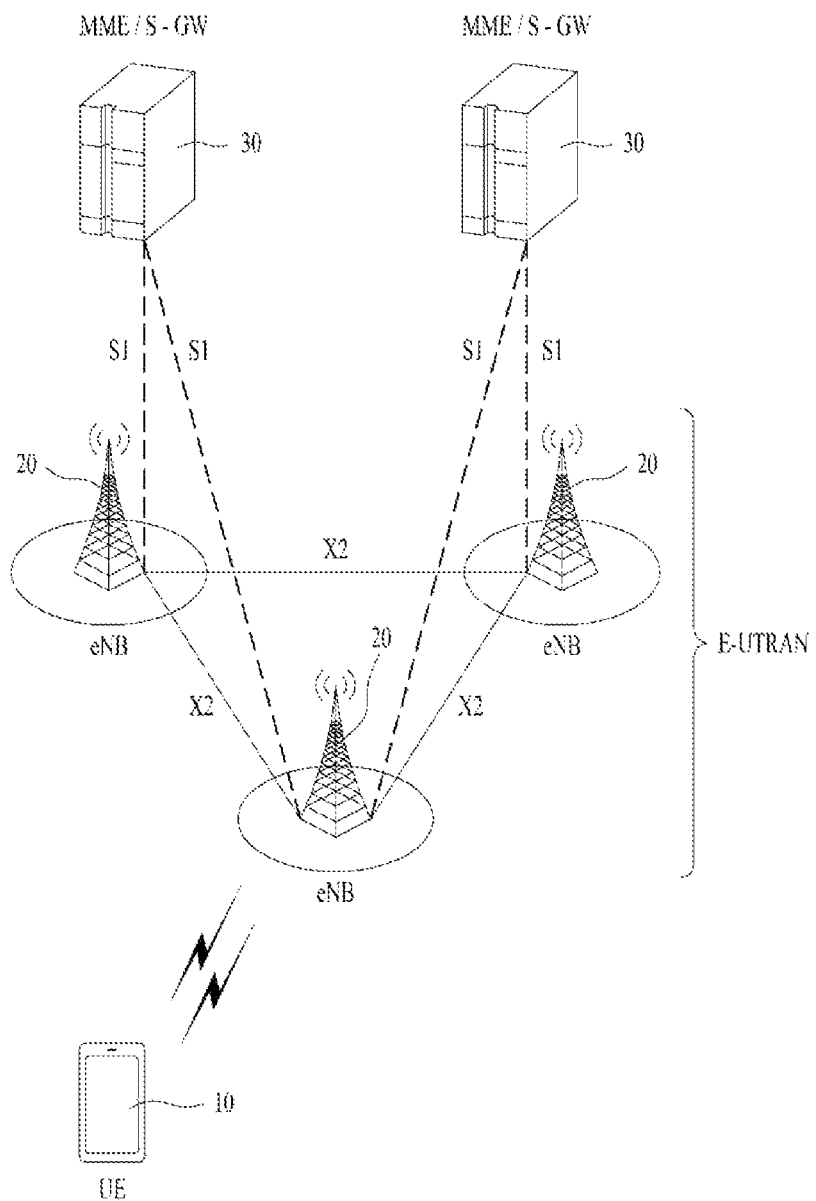
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
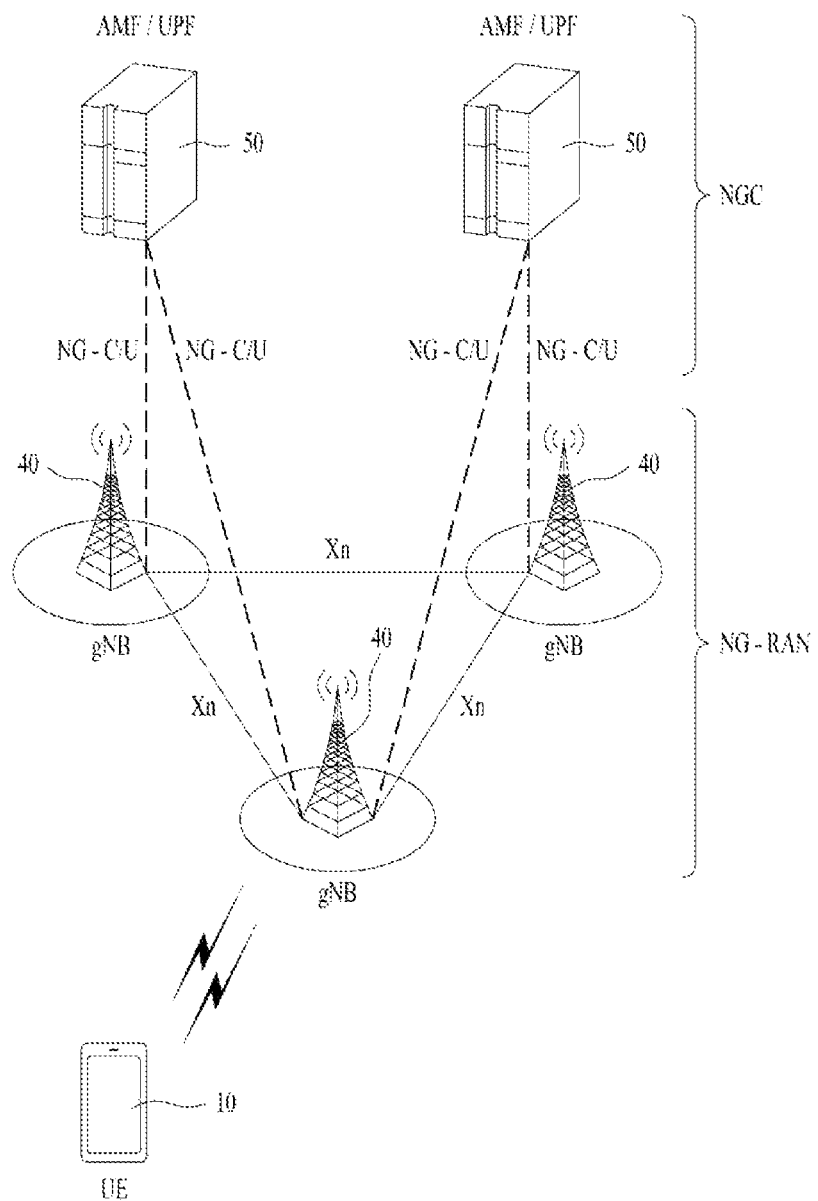
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
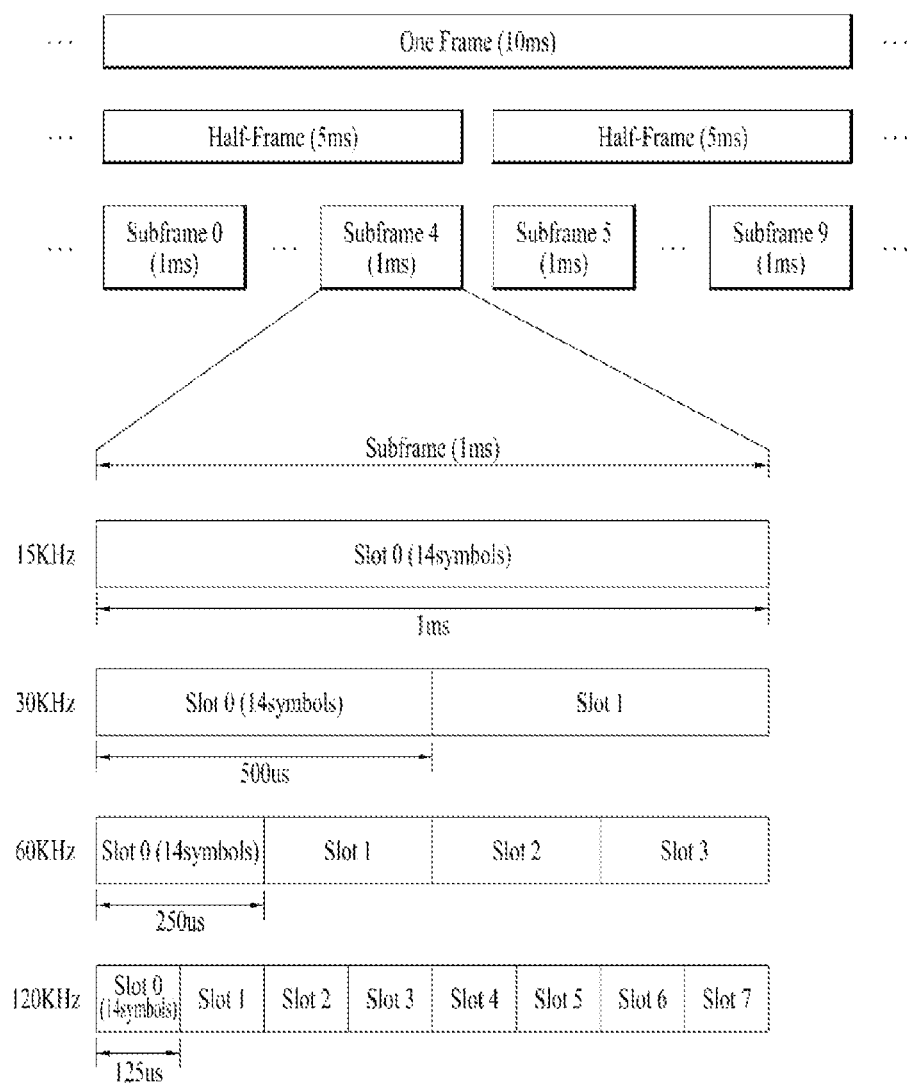
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame $N^{frame,u}_{slot}$, and the number of slots per subframe $N^{subframe,u}_{slot}$ according to an SCS configuration μ in the NCP case.

TABLE 1

| SCS ($15 * 2^u$) | | $N^{slot}_{symb}$ | $N^{frame, u}_{slot}$ | $N^{subframe, u}_{slot}$ |
|---|---|---|---|---|
| 15 KHz | (u = 0) | 14 | 10 | 1 |
| 30 KHz | (u = 1) | 14 | 20 | 2 |
| 60 KHz | (u = 2) | 14 | 40 | 4 |
| 120 KHz | (u = 3) | 14 | 80 | 8 |
| 240 KHz | (u = 4) | 14 | 160 | 16 |

Table 2 below lists the number of symbols per slot, the number of slots per frame, and the number of slots per subframe according to an SCS in the ECP case.

TABLE 2

| SCS ($15 * 2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
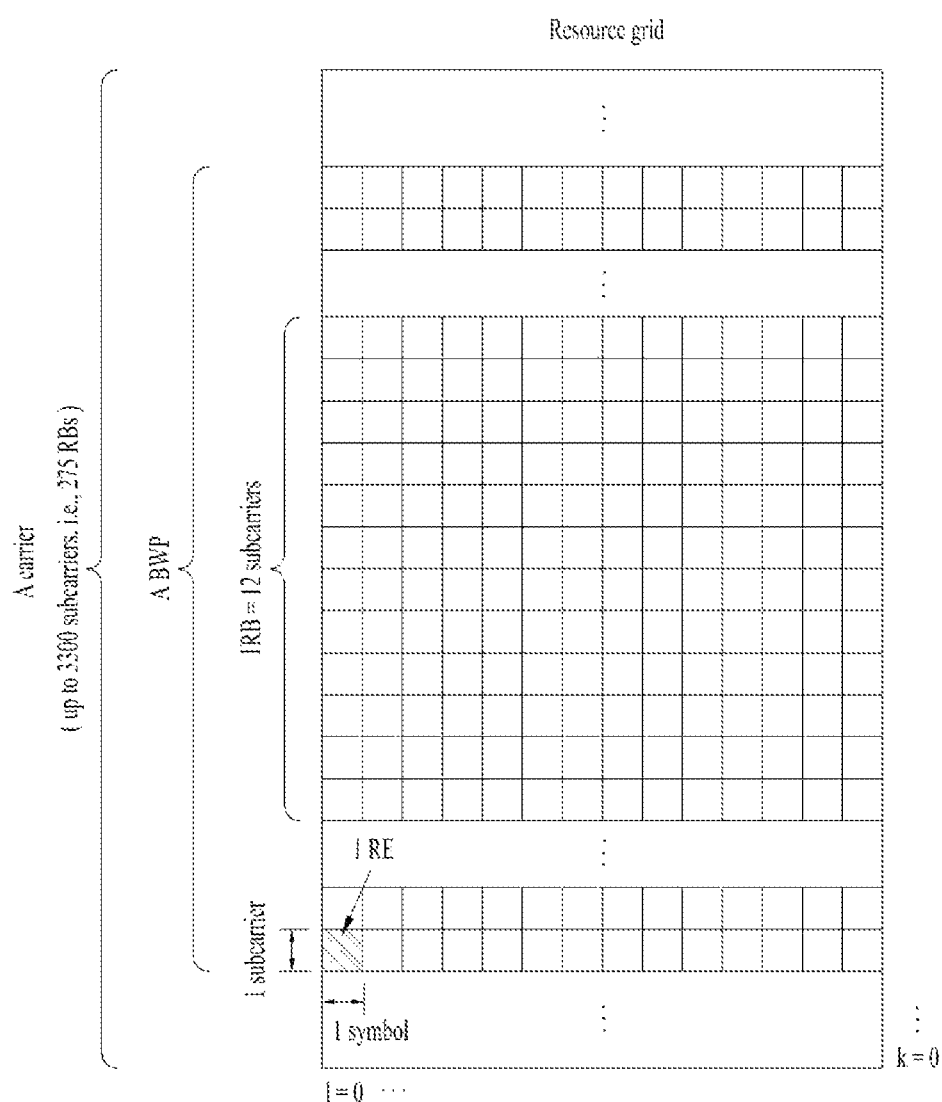
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
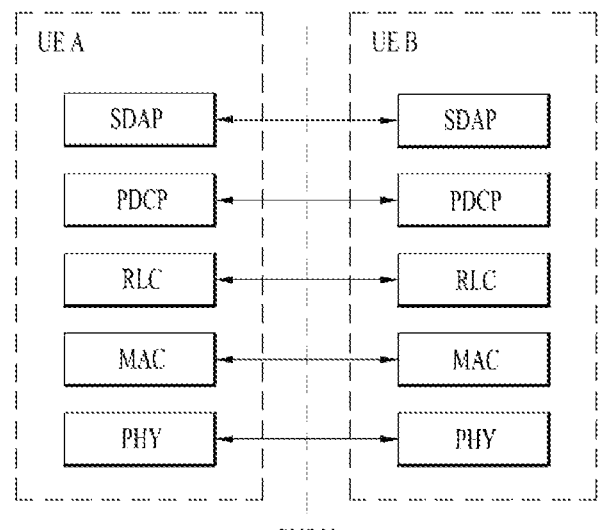
FIG. 6 illustrates a radio protocol architecture for SL communication.
Figure 6:
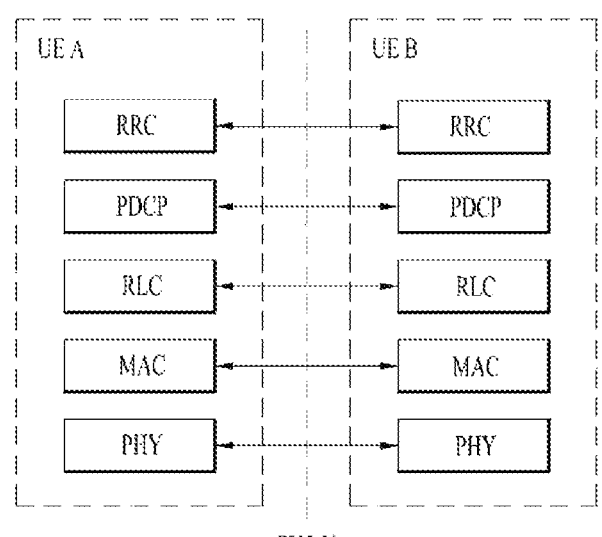

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
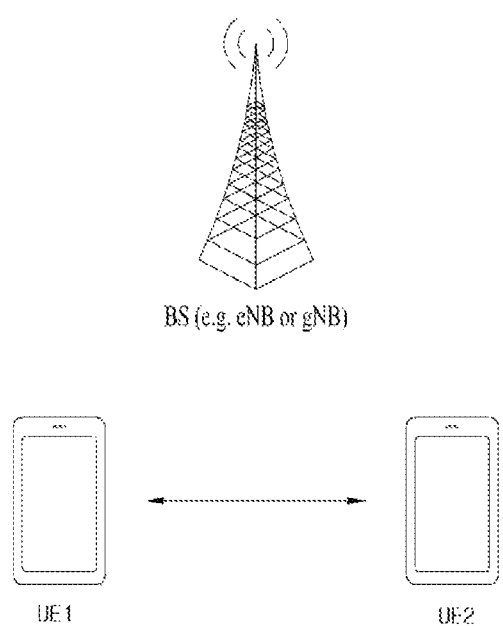
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
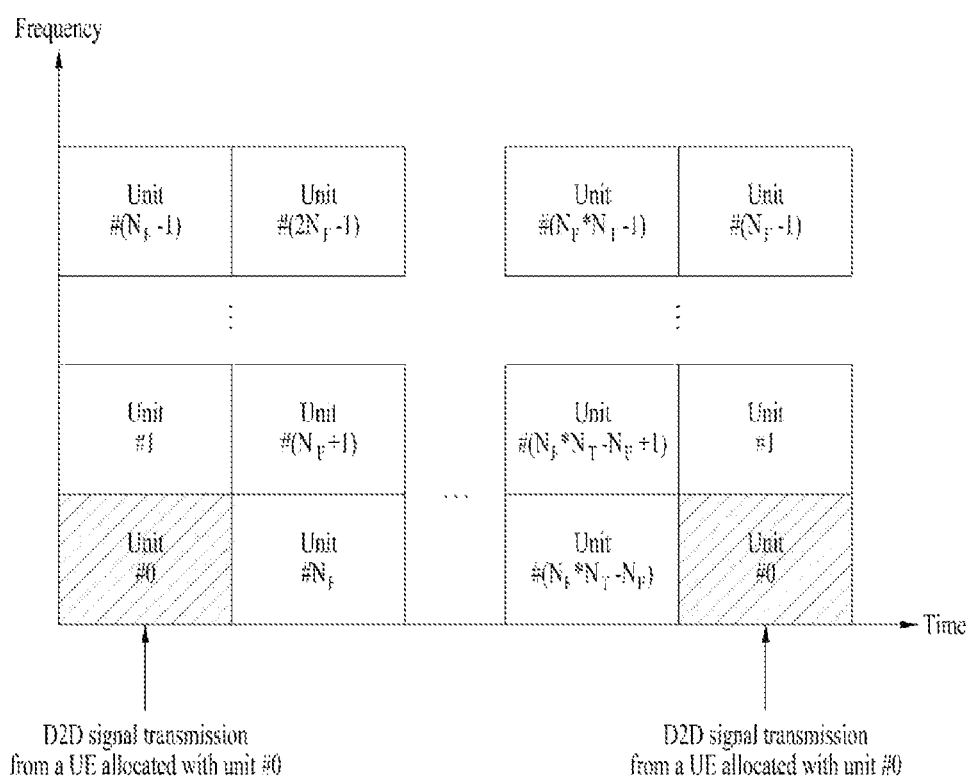
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
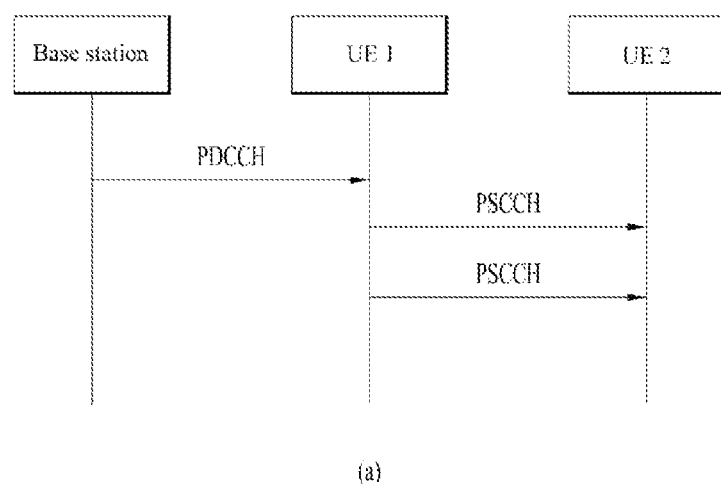
FIG. 9 illustrates a procedure in which UEs perform V2X or SL communication according to a transmission mode.
Figure 9:
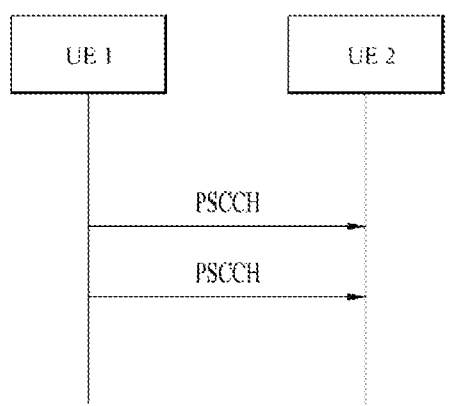

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information;

and/or

SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

Generally, for the purpose of overcoming the pathloss problem when using a very high frequency such as mmWave, beamforming may be used. In order to use such beamforming, the best beam pair should be detected from among several beam pairs between a transmitter and a receiver. From the viewpoint of the receiver, the above-mentioned process may be referred to as a beam acquisition process or a beam tracking process. In particular, since analog beamforming is used in mmWave, the vehicle needs to perform beam sweeping that performs beam switching in different directions at different time points using an antenna array of the vehicle in the beam acquisition or beam tracking process.

Figure 10:
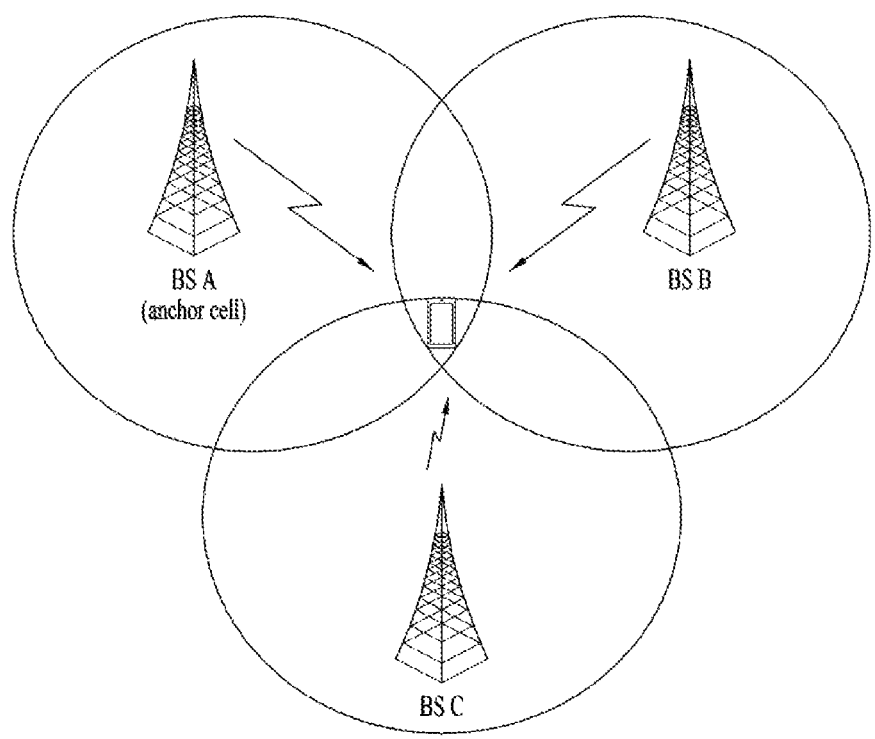
FIG. 10 is a diagram illustrating an Observed Time Difference Of Arrival (OTDOA) positioning method applicable to the present disclosure.

FIG. 10 is a diagram illustrating an Observed Time Difference Of Arrival (OTDOA) positioning method to which various embodiments are applicable.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from three or more geographically-distributed TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 1]}$$

In Equation 1, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method may partially utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

TADV Type 1=(ng-eNB Rx-Tx time difference)+(UE E-UTRA Rx-Tx time difference)

TADV Type 2=Ng-eNB Rx-Tx Time Difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Location Recognition of Vehicle Using Two RSUs

Figure 11:
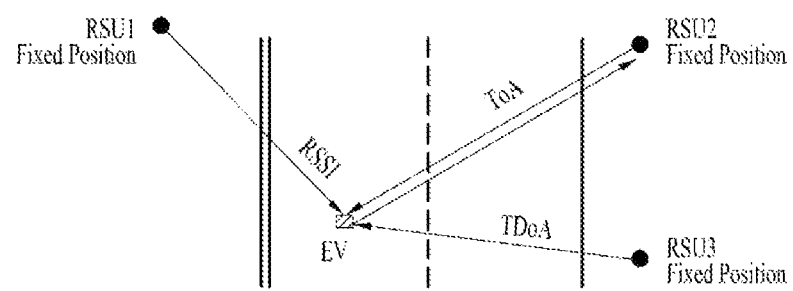
FIG. 11 is a diagram illustrating a method of estimating the location of a vehicle using a plurality of rode side units (RSUs).
Figure 11:
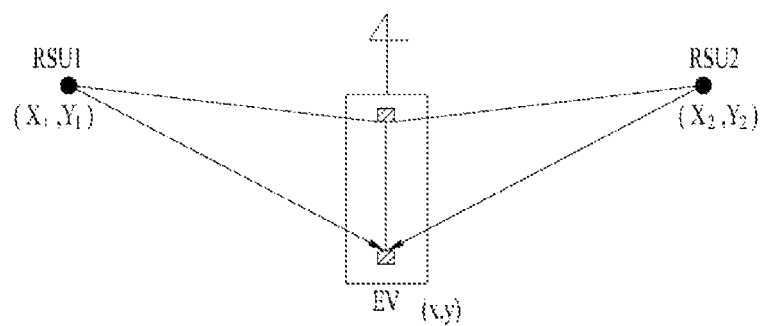

FIG. 11 is a diagram illustrating a method of estimating the location of a vehicle using a plurality of rode side units (RSUs).

Referring to FIG. 11(a), a V2X vehicle EV may estimate or calculate the location thereof through communication with each of three RSUs. Specifically, the V2X vehicle EV may calculate a distance from a signal received from each of the RSUs of three points mounted around the road and estimate the location thereof based on the calculated distance. That is, in order to calculate two unknown values such as x and y coordinates of the V2X vehicle EV, three equations are required, and thus the V2X vehicle EV may need to receive signals from the three RSUs.

In this case, for location recognition based on the three RSUs to measure the distance, the V2X vehicle should secure line-of-sight (LOS) with each of the three RSUs. In particular, the V2X vehicle has a significant difficulty in securing the LOS with all of the three RSUs due to road conditions and buildings around the road in the case of an urban environment.

In this regard, as illustrated in FIG. 11(b), a method in which the V2X vehicle EV calculates and corrects the location thereof only by communication with each of two RSUs is proposed. To estimate the location from the two RSUs, it is assumed that the V2X vehicle EV includes or is equipped with a first antenna and a second antenna distributed a predetermined distance apart.

Figure 12:
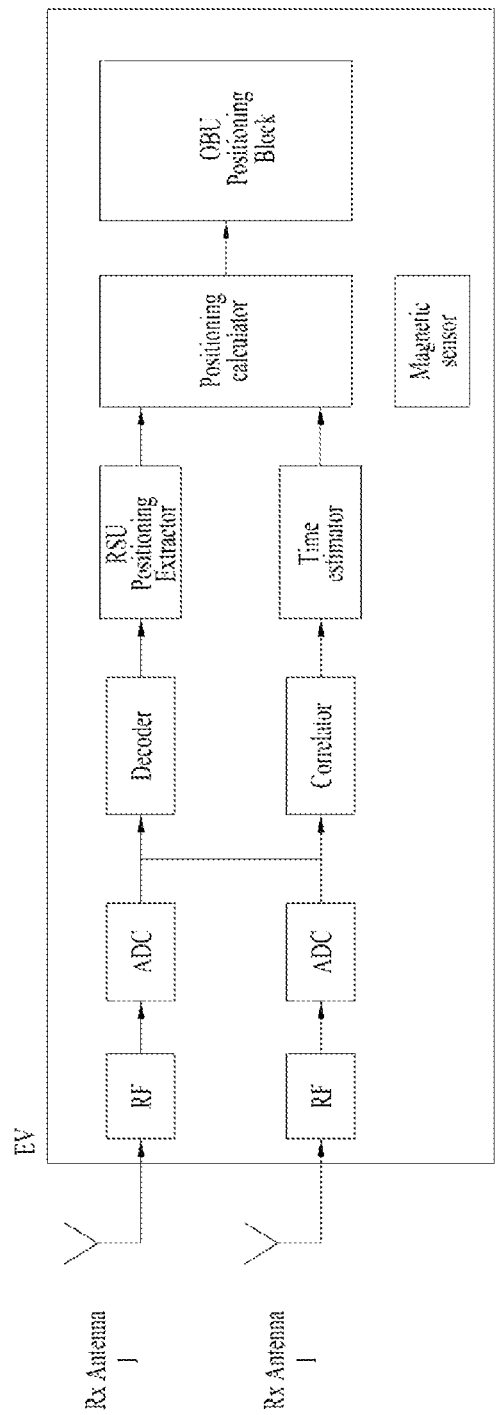
FIG. 12 is a block diagram illustrating a configuration of a V2X vehicle equipped with two distributed antennas.

FIG. 12 is a block diagram illustrating a configuration of a V2X vehicle equipped with two distributed antennas.

Referring to FIG. 12, a V2X vehicle EV includes two antennas. The two antennas are separated by a preconfigured distance (or a predetermined distance). An analog signal received through each antenna may be converted into a digital signal via a radio frequency (RF) module and an analog-to-digital converter (ADC). Thereafter, the converted signal may be transmitted to a data processing part and a signal processing part. The data processing part may extract a message of an RSU through a decoder. An RSU positioning extractor may extract positioning information corresponding to an absolute location of an RSU from the RSU message. The extracted positioning information may be transmitted to a positioning calculator.

The signal processing part measures a time difference of arrival (TDoA) of two signals by comparing the two signals using a correlator after the ADC. After fixing a signal received from one antenna, the signal processing part delays a signal received from the other antenna and searches for a maximum point by correlating the signals. In this case, a signal delayed value becomes a time difference value between the two signals. Thereafter, the signal time difference (or TDoA) received from one RSU is transmitted to the positioning calculator.

The positioning calculator receives an absolute location of the RSU from the data processing part and receives the signal time difference (or TDoA) from the signal processing part. Furthermore, the positioning calculator receives information about the direction of the vehicle using a geomagnetic sensor included in the vehicle. The positioning calculator may calculate two hyperbolas using absolute locations of the two RSUs, the TDoA, and the direction (or forward direction) of the vehicle. The positioning calculator may estimate the location of the vehicle EV using the calculated two hyperbolas (or the intersection of the two hyperbolas). The estimated location information of the V2X vehicle EV is transmitted to a positioning block of an on-board unit (OBU) to update the location of the vehicle.

Figure 13:
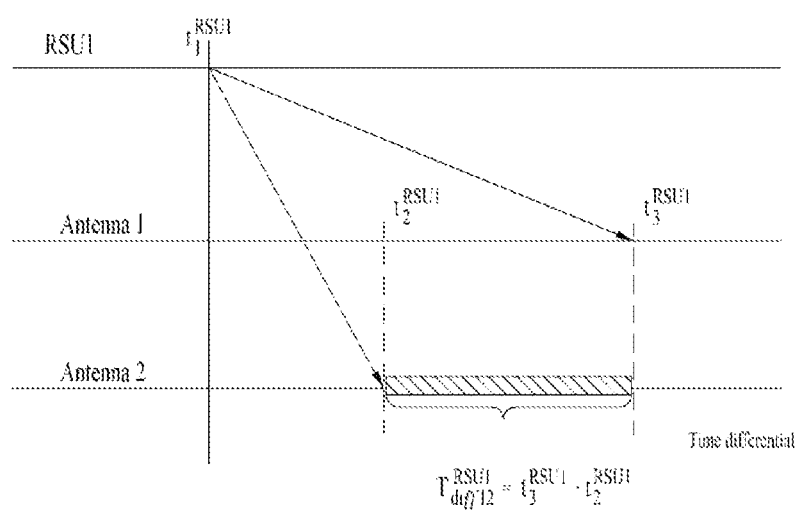
FIGS. 13 and 14 are diagrams illustrating a method in which a V2X vehicle estimates the location thereof by calculating a time difference using two distributed antennas thereof.
Figure 14:
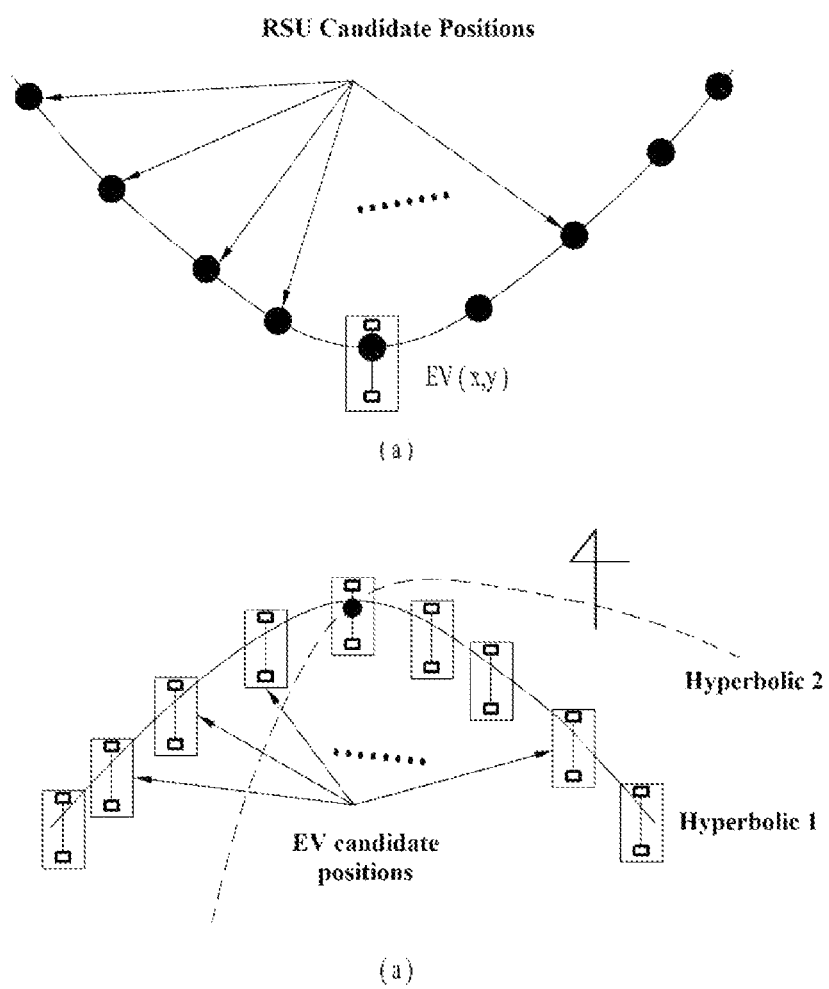

FIGS. 13 and 14 are diagrams illustrating a method in which a V2X vehicle estimates the location thereof by calculating a time difference using two distributed antennas thereof.

Referring to FIG. 13, the V2X vehicle may receive a signal (transmitted at t1) from a first RSU RSU1 through a first antenna and a second antenna. In this case, the first antenna may receive the signal of the first RSU at a second time t2 and the second antenna may receive the signal of the first RSU at a third time t3. The vehicle may estimate a relative distance to the first RSU based on a difference (or a first TDoA) between the second time and the third time.

Referring to FIG. 14(a), when the time difference is used as the above-described method, a relative distance of the V2X vehicle from the first RSU may be estimated using a hyperbolic equation similar to the TDoA. According to the hyperbolic equation, the first RSU may be positioned along a hyperbola based on the vehicle. Meanwhile, the first RSU may transmit a signal including an absolute location thereof.

Referring to FIG. 14(b), the location of the first RSU related to the hyperbola may be fixed by applying the absolute location of the first RSU. In this case, a hyperbolic equation (or existing hyperbolic equation) based on the V2X vehicle may be converted into a hyperbolic equation indicating multiple candidate locations at which the V2X vehicle may be located based on the first RSU by fixing the location of the first RSU. In other words, a hyperbola corresponding to a plurality of candidate locations of the V2X vehicle having a relative distance according to the calculated time difference (or first TDoA) based on the absolute location of the first RSU may be calculated. That is, as illustrated in FIG. 14(b), the hyperbola according to the existing hyperbolic equation (the hyperbola illustrated in FIG. 14(a)) may be converted based on the absolute location of the first RSU.

However, as illustrated in FIG. 14(b), there may be a plurality of hyperbolas based on the absolute location of the first RSU. In order to estimate the location of the V2X vehicle, it is necessary to specify one hyperbola among the plurality of hyperbolas.

To specify one hyperbola, the direction (or a forward direction or a traveling direction) of the V2X vehicle measured using a geomagnetic sensor of the V2X vehicle may be additionally considered. That is, upon applying the direction of the V2X vehicle, the V2X vehicle may specify one hyperbola (or a first hyperbola) having a direction corresponding to the direction of the vehicle among the plurality of hyperbolas. In other words, one hyperbola may be calculated by applying the direction of the V2X vehicle using the geomagnetic sensor, the absolute location of the first RSU, and the calculated time difference. In this case, the V2X vehicle may be located along the specified one hyperbola (or first hyperbola).

In this way, the V2X vehicle may calculate one hyperbola (or first hyperbola) corresponding to a plurality of locations at which the V2X vehicle may be located through the first time difference (or first TDoA) calculated from the signals of the first RSU received respectively at the first antenna and the second antenna, the direction of the V2X vehicle, and the absolute location of the first RSU.

Figure 15:
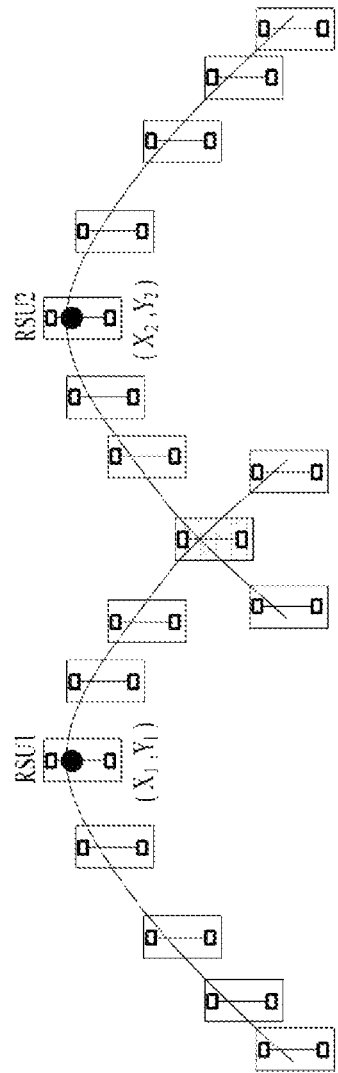
FIG. 15 is a diagram illustrating a method in which a V2X vehicle estimates the location thereof based on signals received respectively from two RSUs.

FIG. 15 is a diagram illustrating a method in which a V2X vehicle estimates the location thereof based on signals received respectively from two RSUs.

Referring to FIG. 15, the V2X vehicle may specify or calculate a first hyperbola based on a signal of a first RSU and a second hyperbola based on a signal of a second RSU in the manner described with reference to FIG. 14. The V2X vehicle may calculate an intersection of the two hyperbolas and estimate an absolute location of the V2X vehicle based on the intersection.

Specifically, the V2X vehicle may receive a first signal from the first RSU RSU1 using a first antenna and a second antenna and receive a second signal from the second RSU1 using the first antenna and the second antenna. The V2X vehicle may calculate a first time difference (or a first TDoA), which is a difference in reception time of the first signal between the distributed antennas, and calculate a second time difference (or a second TDoA), which is a difference in reception time of the second signal between the distributed antennas. In addition, the V2X vehicle may obtain an absolute location of the first RSU from the first signal and an absolute location of the second RSU from the second signal and obtain a direction (or a forward direction or a traveling direction) of the V2X vehicle through a geomagnetic sensor. In this case, as described with reference to FIG. 14, the V2X vehicle may calculate the first hyperbola based on the first time difference, the direction of the vehicle, and the absolute location of the first RSU and calculate the second hyperbola based on the second time difference, the direction of the vehicle, and the absolute location of the second RSU.

In this case, the vehicle may calculate an intersection of the first hyperbola and the second hyperbola and estimate an absolute position thereof based on the calculated intersection. However, the location of the vehicle estimated through the two hyperbolas or two hyperbolic equations may cause a predetermined error due to a difference in location between the two antennas corresponding to each of the two time differences. In other words, the location of the V2X vehicle may be determined based on the first antenna or the second antenna, and an intersection of the first hyperbola and the second hyperbola may not be located on the first antenna or the second antenna. In this case, an error may occur when the V2X vehicle estimates the location thereof based on the intersection. Hereinafter, a method of correcting the predetermined error will be described in detail.

Figure 16:
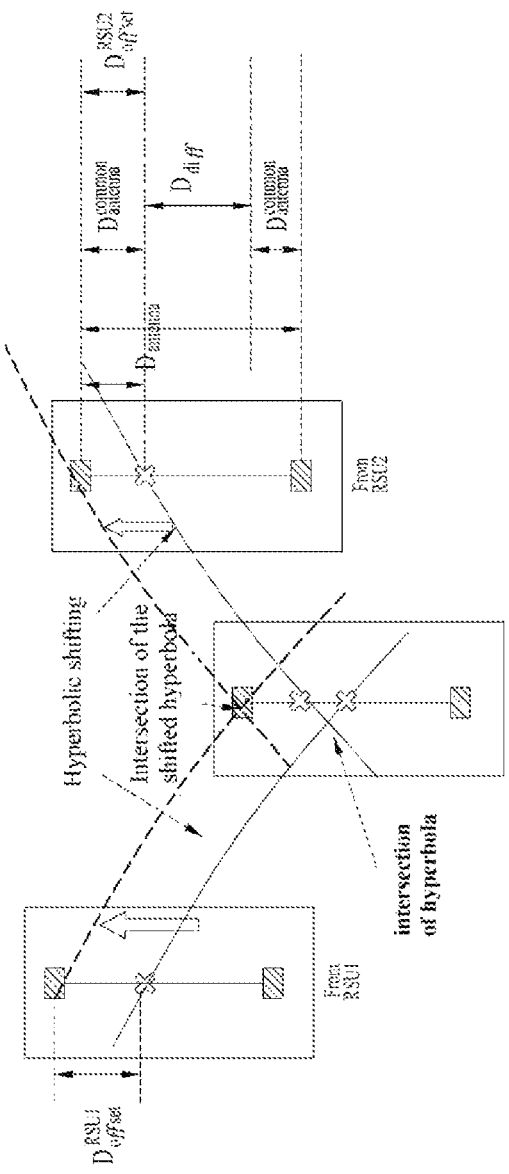
FIGS. 16 and 17 are diagrams illustrating a method of correcting an error in positioning estimation using two RSUs
Figure 17:
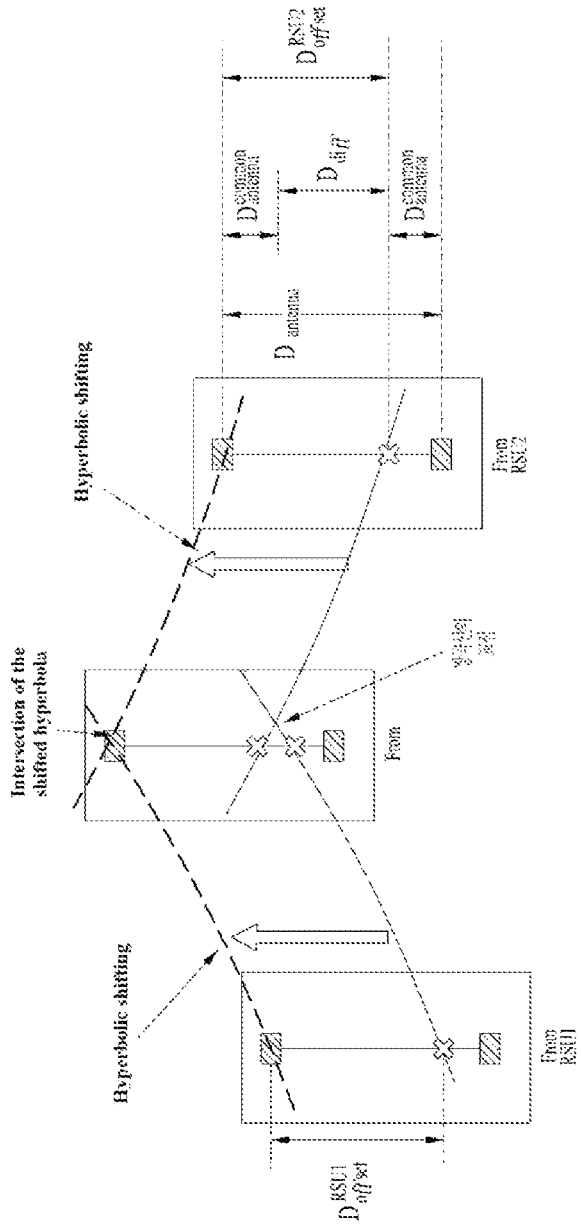

FIGS. 16 and 17 are diagrams illustrating a method of correcting an error in positioning estimation using two RSUs.

Here, a first antenna may be defined as a front antenna positioned in front of the vehicle, and a second antenna may be defined as a rear antenna positioned in the rear of the vehicle. The first antenna and the second antenna may be distributed a predetermined distance apart. In addition, as described above, the location of the V2X vehicle may be determined based on the first antenna or the second antenna (generally, the location of the V2X vehicle may correspond to the location of the first antenna).

Referring to FIGS. 16 and 17, FIG. 16 illustrates the case in which a signal of a first RSU and/or a signal of a second RSU is received first at the first antenna among the first antenna and the second antenna, and FIG. 17 illustrates the case in which the signal of the first RSU and/or the signal of the second RSU is received first at the second antenna.

First, the method of correcting the error will now be described with reference to FIG. 16 on the premise that the signal of the first RSU and/or the signal of the second RSU is received first at the first antenna among the first antenna and the second antennas.

An intersection of the first hyperbola and the second hyperbola may not be located on a straight line (hereinafter, a first straight line) between the first antenna and the second antenna as illustrated in FIG. 16. That is, the intersection and the location of the vehicle (generally, the location of the first antenna which is the front antenna) may not match.

For example, when the first time difference is 0, the first hyperbola may intersect the center of the first straight line and, when the first time difference is greater than 0, the first hyperbola may intersect a position biased toward the first antenna on the first straight line. Here, the size of the biased degree depends on the size of the first time difference. That is, when the first time difference and the second time difference are different, a position at which the first hyperbola intersects the first straight line may be different from a position at which the second hyperbola intersects the first straight line. In this case, an intersection of the first hyperbola and the second hyperbola may not be located on the first straight line.

Therefore, correction needs to be performed such that the intersection of the first hyperbola and the second hyperbola is located at the location of the vehicle (or the location of any one of the first antenna and the second antenna).

To this end, the V2X vehicle needs to determine a first crossing point at which the first hyperbola intersects the first straight line and a second crossing point at which the second hyperbola intersects a second straight line and determine a first offset for correcting the first hyperbola and a second offset for correcting the second hyperbola, based on the first crossing point and the second crossing point.

Specifically, the V2X vehicle may calculate a first distance difference (or a first distance) by multiplying the first time difference by a propagation speed and calculate a second distance difference (or a second distance) by multiplying the second time difference by the propagation speed. The V2X vehicle may calculate a first separation distance by applying the calculated first distance difference and the predetermined distance (or distributed distance) to Equation 2 below. Similarly, the V2X vehicle may calculate a second separation distance by applying the calculated second distance difference and the distributed distance to Equation 2 below.

$$D_{antenna}^{common} = (D_{Antenna} - D_{diff})/2 \qquad \text{[Equation 2]}$$

As illustrated in FIG. 16, when the signal of the RSU first arrives at the first antenna, $D_{antenna}^{common}$ corresponds to the first separation distance and/or the second separation distance, Dantena corresponds to the distributed distance or the predetermined distance, and Ddiff corresponds to the first distance difference and/or the second distance difference.

Next, the vehicle may determine the first offset based on the first separation distance and determine the second offset based on the second separation distance. For example, the first offset may be determined to be a value corresponding to the first separation distance, and the second offset may be determined to be a value corresponding to the second separation distance.

The V2X vehicle may correct (or parallel-move) the first hyperbola by applying the first offset to the first hyperbola (or an equation for the first hyperbola) and correct (or parallel-move) the second hyperbola by applying the second offset to the second hyperbola (or an equation for the second hyperbola). In this case, since an intersection (or corrected intersection) of the corrected first hyperbola and the corrected second hyperbola corresponds to the location of the first antenna, the V2X vehicle may determine the location thereof based on the corrected intersection.

In this case, the vehicle may correct an error caused by mismatch between the intersection of the first hyperbola and the second hyperbola and the location of the vehicle (or the location of the first antenna).

In contrast, as illustrated in FIG. 17, when the signal of the first RSU first arrives at the second antenna, which is a rear antenna, the first separation distance and the second separation distance may be differently determined.

Specifically, referring to FIG. 17, the first offset corresponds to the sum of the first separation distance derived by Equation 2 and the first distance difference (or the first distance), and the second offset corresponds to the sum the second separation distance derived by Equation 2 and the second distance difference (or the second distance).

That is, the first offset and the second offset may be differently determined according to which antenna among the first antenna and the second antenna the signal of the RSU first reaches.

Figure 18:
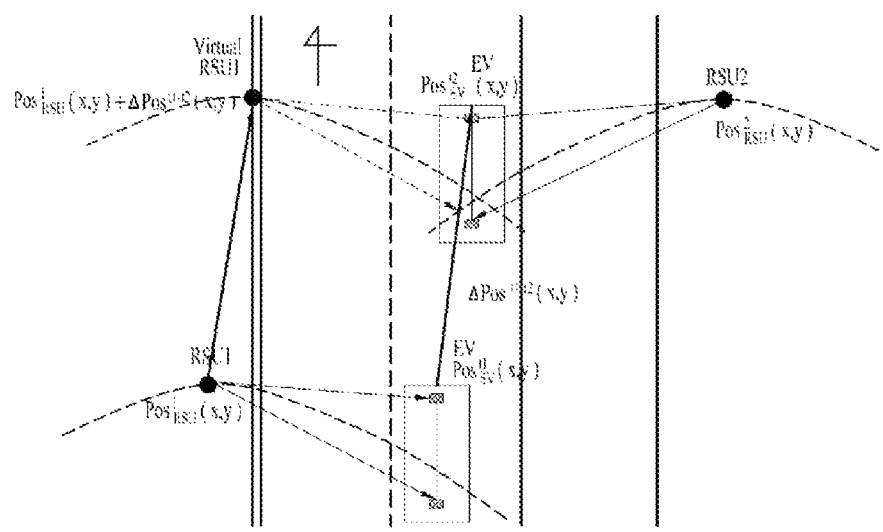
FIGS. 18 and 19 are diagrams illustrating a positioning estimation method of a vehicle according to an arrangement situation of RSUs.
Figure 19:
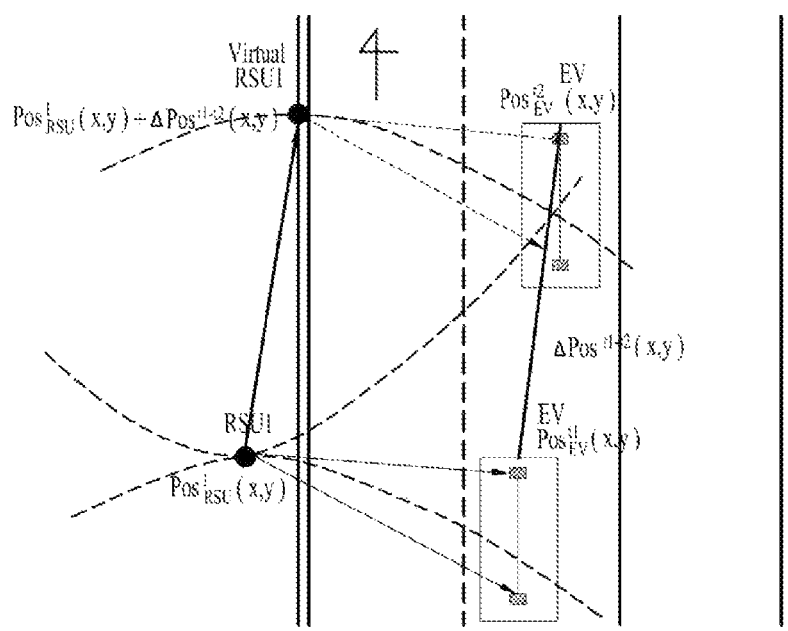

FIGS. 18 and 19 are diagrams illustrating a positioning estimation method of a vehicle according to an arrangement situation of RSUs.

Referring to FIG. 18, the RSUs may not be located at a distance at which signals are simultaneously received. In other words, the V2X vehicle may not receive a first signal from a first RSU and a second signal from a second RSU at the same timing.

For example, the V2X vehicle acquires a fixed location of the first RSU through communication with the first RSU1 at a time T1 and obtains a hyperbolic equation using a TDoA. In this case, since there are no other RSUs, the positioning estimation method using two RSUs may not be used. Next, the vehicle tracks a moved location until the next RSU (second RSU RSU2) appears using an inertial measurement unit (IMU) to measure a moved distance amount. In other words, the V2X vehicle may continuously accumulate a location change amount (or accumulated inertia change amount) of the vehicle after T1 by using an inertial sensor such as the IMU.

Upon receiving a second signal transmitted by the second RSU RSU2 at a time T2 after the time T1, the V2X vehicle may apply the location change amount (or estimated location change amount from T1 to T2) to the absolute location and/or the hyperbolic equation of the first RSU acquired at the time T1. For example, the V2X vehicle may calculate a hyperbolic equation in a virtual first RSU (virtual RSU1) by applying the location change amount to the absolute location and/or the hyperbolic equation of the first RSU. Alternatively, the V2X vehicle may determine an absolute location of the virtual first RSU1 by applying the location change amount to the absolute location of the first RSU and estimate a virtual first hyperbola based on the determined absolute location of the virtual first RSU, the first TDoA acquired at T1, and the forward direction. In this case, the V2X vehicle may estimate the location thereof according to the above-described positioning estimation method (FIGS. 14 to 17) using the absolute location and/or the hyperbolic equation of the first RSU, to which the location change amount is applied, and the absolute location and the hyperbolic equation of the second RSU, obtained at the time T2.

Referring to FIG. 19, the V2X vehicle may estimate the location thereof using only a first RSU (RSU1).

The V2X vehicle may obtain a hyperbolic equation based on the absolute location of the first RSU RSU1 through communication with the first RSU RSU1 at the time T1 and on the above-described first TDoA. In this case, since there are no other RSUs, the V2X vehicle may fail to estimate or generate an absolute location thereof according to the positioning estimation method proposed in FIGS. 14 to 17. Meanwhile, the V2X vehicle may previously store the acquired absolute location of the first RSU and/or the above-described TDoA (or hyperbolic equation).

Thereafter, at T2, the vehicle may estimate the absolute location of the virtual first RSU by applying the estimated location change amount estimated using the IMU to the stored absolute location (and/or hyperbolic equation) of the first RSU as described with reference to FIG. 18 and calculate a virtual hyperbolic equation based on the first TDoA. In addition, the V2X vehicle may receive a signal from the first RSU again at T2 (e.g., repeatedly receive a first signal transmitted periodically after T1) and calculate a new hyperbola (or a new hyperbolic equation) based on the received signal. In this case, the V2X vehicle may estimate or generate the absolute location thereof according to the positioning estimation method proposed in FIGS. 14 to 17 based on the virtual hyperbola of the virtual first RSU and the new hyperbola.

For example, the V2X vehicle may obtain a third TDoA and a third absolute location of the first RSU at the time T1, based on the signal received from the first RSU. The V2X vehicle may obtain and store a third hyperbola or a third hyperbolic equation, based on the third absolute location and the third TDoA. Thereafter, the V2X vehicle may receive a new signal from the first RSU at the time T2 and obtain a fourth hyperbola or a fourth hyperbolic equation, based on the signal received from the first RSU at the time T2. In addition, the V2X vehicle may obtain a location change amount up to T2 after T1 through a sensor. The vehicle may apply the obtained location change amount to the third absolute location (and/or the third hyperbola or third hyperbolic equation) and estimate a virtual third hyperbola and a virtual absolute location of the first RSU. The V2X vehicle may estimate or generate the absolute location thereof according to the positioning estimation method proposed in FIGS. 14 to 17 based on the fourth hyperbola and the virtual third hyperbola.

Figure 20:
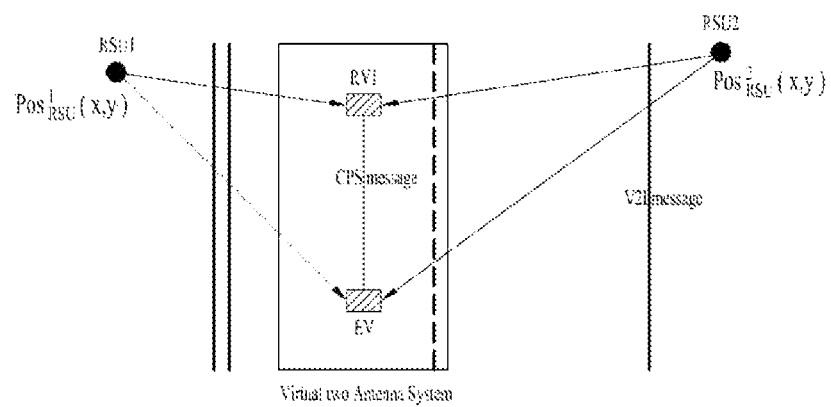
FIG. 20 is a diagram illustrating a positioning estimation method using two RSUs through cooperation of a plurality of vehicles.

FIG. 20 is a diagram illustrating a positioning estimation method using two RSUs through cooperation of a plurality of vehicles.

Referring to FIG. 20, at least one of two V2X vehicles may not be equipped with distributed antennas. In this case, each of the two V2X vehicles RV1 and RV2 located between two RSUs RSU1 and RSU2 may receive RSU signals using one antenna. Here, accurate relative locations of the two V2X vehicles RV1 and RV2 may be determined using advanced driver assistance system (ADAS) sensors of the two V2X vehicles RV1 and RV2.

In this way, when a relative distance (e.g., corresponding to a predetermined distance or a distributed distance) based on the relative locations measured between the two V2X vehicles is capable of being calculated, the two V2X vehicles may be operated as if the two V2X vehicles receive signals from antennas distributed the relative distance apart even though each of the two V2X vehicles receive signals from the two RSUs through one antenna. That is, if the two V2X vehicles share the relative locations therebetween and times at which the signals are received from the RSUs, the two V2X vehicles have a structure with virtual dual antennas (or two distributed antennas). Therethrough, absolute locations of the two V2X vehicles may be obtained using the algorithm described above.

For example, each of the first V2X vehicle RV1 and the second V2X vehicle RV2 may receive signals from the first RSU RSU1 and the second RSU RSU2, respectively, at a specific timing. The first V2X vehicle and the second V2X vehicle may share information about times at which the signals from the first RSU are received and information about times at which the signals from the second RSU are received. The first V2X vehicle and the second V2X vehicle may calculate a first TDoA of the signals received from the first RSU and a second TDoA of the signals received from the second RSU through the shared time information. The first V2X vehicle and the second V2X vehicle may obtain a first hyperbola based on the first TDoA and the relative distance and obtain a second hyperbola based on the second TDoA and the relative distance. The first vehicle and the second vehicle may perform correction such that an intersection of the hyperbolas should be positioned in the first V2X vehicle or the second V2X vehicle by applying the offsets described in FIGS. 15 and 16 based on the intersection of the first hyperbola and the second hyperbola (or on the first hyperbola and the second hyperbola). In this case, the first V2X vehicle or the second V2X vehicle may estimate an absolute location of the first V2X vehicle and an absolute location of the second V2X vehicle, based on information about the intersection of the corrected hyperbolas and the relative distance. For example, the first V2X vehicle or the second V2X vehicle may estimate the absolute location of the first V2X vehicle based on the intersection of the corrected hyperbolas and estimate the absolute location of the second V2X vehicle by applying the relative distance to the estimated absolute location of the first V2X vehicle.

As such, a V2X vehicle with one or two distributed antennas may accurately estimate or recognize a location thereof using only two RSUs (or one RSU) through the proposed method. In this case, the V2X vehicle may easily secure an LOS with each of the two RSUs, and the two RSUs may also be easily installed at locations or with arrangement capable of securing the LOS with the V2X vehicle on the road. In particular, even in a shadow area in which a GPS is not available or in a downtown area in which the GPS is inaccurate, the V2X vehicle may estimate or recognize a location thereof only with two RSUs.

Figure 21:
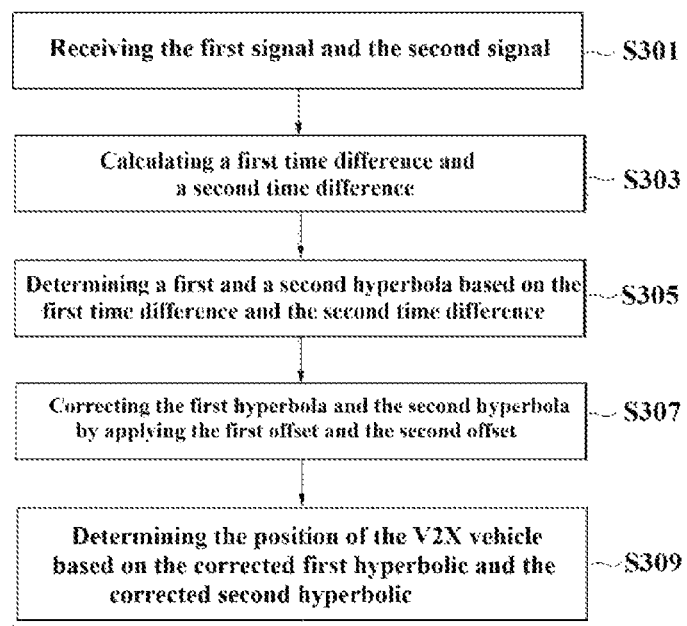
FIG. 21 is a diagram illustrating a method in which a V2X vehicle determines the location thereof using two RSUs.

FIG. 21 is a diagram illustrating a method in which a V2X vehicle determines the location thereof using two RSUs.

Referring to FIG. 21, the V2X vehicle may receive a first signal from a first RSU and a second signal from a second RSU, through a first antenna and a second antenna distributed a predetermined distance apart (S301). Here, the first antenna may be a front antenna disposed in front of the V2X vehicle, and the second antenna may be a rear antenna disposed in the rear of the V2X vehicle. In addition, the first antenna and the second antenna may be distributively disposed a predetermined distance (or a distributed distance) apart in the forward direction of the V2X vehicle.

The first RSU and the second RSU are fixed at specific positions. For example, the first RSU and the second RSU may be fixedly disposed around the road. The first RSU and the second RSU may periodically transmit the first signal and the second signal, respectively. The first signal may include information (or GPS information) about the location of the first RSU, and the second signal may include information (or GPS information) about the location of the second RSU. Alternatively, the first signal and the second signal may be simultaneously transmitted at a specific time. For example, the first RSU and the second RSU may be preconfigured to transmit the first signal and the second signal at the same timing.

Next, the V2X vehicle may measure (or calculate or acquire) a first time difference, which is a difference in reception time of the first signal between the first antenna and the second antenna, and measure (or calculate or acquire) a second time difference, which is a difference in reception time of the second signal between the first antenna and the second antenna (S303). Here, the first time difference may correspond to a first TDoA, and the second time difference may correspond to a second TDoA.

Next, the V2X vehicle may calculate or determine a first hyperbola for estimating the location thereof based on the first time difference and a second hyperbola for estimating the location thereof based on the second time difference (S305). In addition, the V2X vehicle may measure or detect a forward direction through a geomagnetic sensor to specify any one of a plurality of hyperbolas. Here, the forward direction may be a forward driving direction of the V2X vehicle or a direction from the second antenna to the first antenna.

Specifically, the V2X vehicle may calculate a plurality of hyperbolas based on the first time difference and an absolute location of the first RSU. Each of the plurality of hyperbolas represents a plurality of candidate locations at which the V2X vehicle may be located. In this case, the V2X vehicle may specify one hyperbola corresponding to the detected forward direction among the plurality of hyperbolas by additionally considering the detected forward direction, and the specified hyperbola may be determined as a first hyperbola.

Likewise, the V2X vehicle may calculate a plurality of hyperbolas based on the second time difference and an absolute location of the second RSU. In this case, the V2X vehicle may specify one hyperbola corresponding to the detected forward direction among the plurality of hyperbolas by additionally considering the detected forward direction, and the specified hyperbola may be determined as a second hyperbola.

Alternatively, the V2X vehicle may receive only the first signal from the first RSU at a first time and then receive the second signal from the second RSU at a second time. In this case, the V2X vehicle may determine the first hyperbola by assuming that a virtual first signal is received at the second time from a virtual first RSU rather than the first RSU. Specifically, even if the V2X vehicle receives only the first signal at the first time, the V2X vehicle may store information about the location of the first RSU included in the first signal and store the first time difference measured based on the first signal (or a hyperbolic equation related to the first hyperbola). The V2X vehicle may estimate a location change amount from the first time to the second time through an inertial sensor such as an IMU. Upon receiving the second signal at the second time, the V2X vehicle may determine or estimate information about the location of the virtual first RSU by applying the location change amount to the location of the first RSU (and/or a virtual hyperbolic equation related to the virtual first RSU by applying the location change amount to the hyperbolic equation related to the first hyperbola). The V2X vehicle may calculate the first hyperbola (or a virtual first hyperbola) based on the information about the location of the virtual first RSU, the first time difference, and the forward direction.

Alternatively, methods of calculating the location of the V2X vehicle may be applied by defining the signal received from the first RSU at the first time as the first signal and the signal received from the first RSU at the second time as the second signal.

Next, the V2X vehicle may correct the first hyperbola by applying a first offset to the first hyperbola and correct the second hyperbola by applying a second offset to the second hyperbola (S307). Here, the first offset and the second offset are determined as values for shifting the intersection of the first hyperbola and the second hyperbola to the first antenna or the second antenna of the V2X vehicle, as described with reference to FIGS. 16 and 17. That is, when the first hyperbola is corrected by applying the first offset, the first hyperbola intersects at the first antenna position, and when the second hyperbola is corrected by applying the second offset, the second hyperbola intersects at the second antenna position.

Meanwhile, the location of the V2X vehicle is determined based on one of the first antenna and the second antenna. However, for convenience of description, the location of the V2X vehicle is explained as corresponding to the location of the first antenna or as being determined based on the location of the first antenna.

Specifically, the V2X vehicle may calculate a first distance by multiplying the first time difference or the first TDoA by a propagation speed (e.g., 3×1010 cm/sec) in order to determine the first offset. Based on Equation 2, the V2X vehicle may calculate a first separation distance by subtracting the first distance from a predetermined distance (or a distributed distance between the first antenna and the second antenna) and then dividing the resultant value by 2.

When the first separation distance is calculated, the V2X vehicle may determine the first offset based on the first separation distance. When the first signal is received first at the first antenna, the first offset is determined to be a value corresponding to the first separation distance. In contrast, when the first signal is received first at the second antenna, the first offset is determined to be a value obtained by adding the first distance to the first separation distance.

Likewise, the V2X vehicle may calculate a second distance by multiplying the second time difference or the second TDoA by the propagation speed (e.g., 3×1010 cm/sec) in order to determine the second offset. Based on Equation 2, the V2X vehicle may calculate a second separation distance by subtracting the second distance from a predetermined distance (or the distributed distance between the first antenna and the second antenna) and then dividing the resultant value by 2.

When the second separation distance is calculated, the V2X vehicle may determine the second offset based on the second separation distance. When the second signal is received first at the first antenna, the second offset is determined to be a value corresponding to the second separation distance. In contrast, when the second signal is received first at the second antenna, the second offset is determined to be a value obtained by adding the second distance to the second separation distance.

Next, the V2X vehicle may determine the location thereof based on an intersection of the corrected first hyperbola and the corrected second hyperbola (or the first hyperbola to which the first offset is applied and the second hyperbola to which the second offset is applied) (S309). For example, when the location of the V2X vehicle is the same as or corresponds to the location of the first antenna, the V2X vehicle may determine the intersection of the corrected first hyperbola and the corrected second hyperbola as the location thereof.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 22:
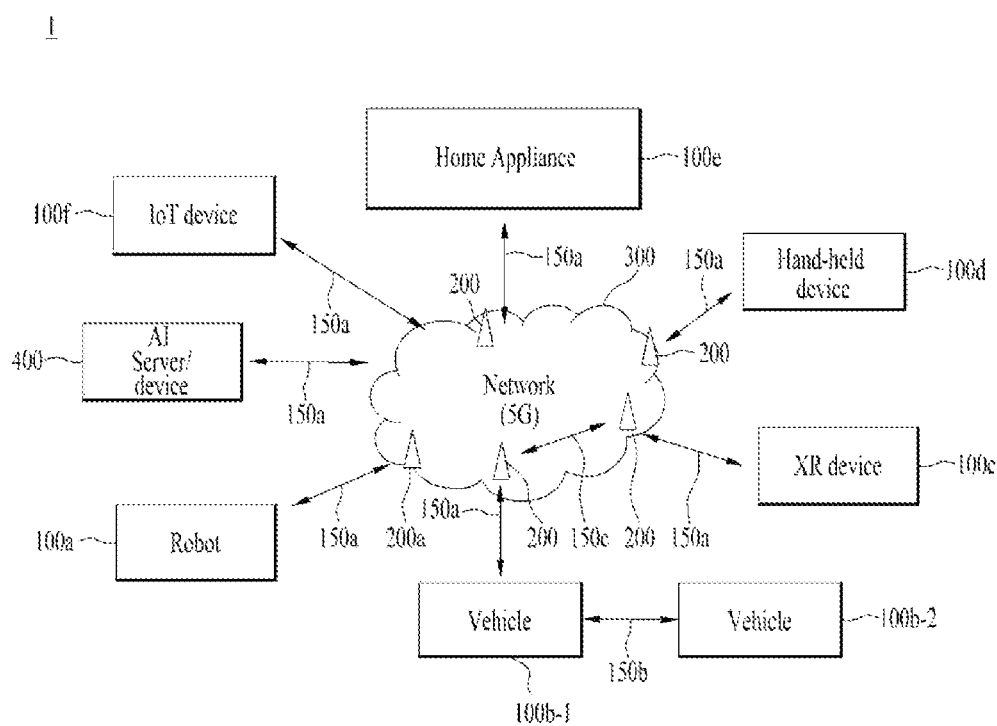
FIG. 22 illustrates a communication system applied to the present disclosure.

FIG. 22 illustrates a communication system applied to the present disclosure.

Referring to FIG. 22, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BS s/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 23:
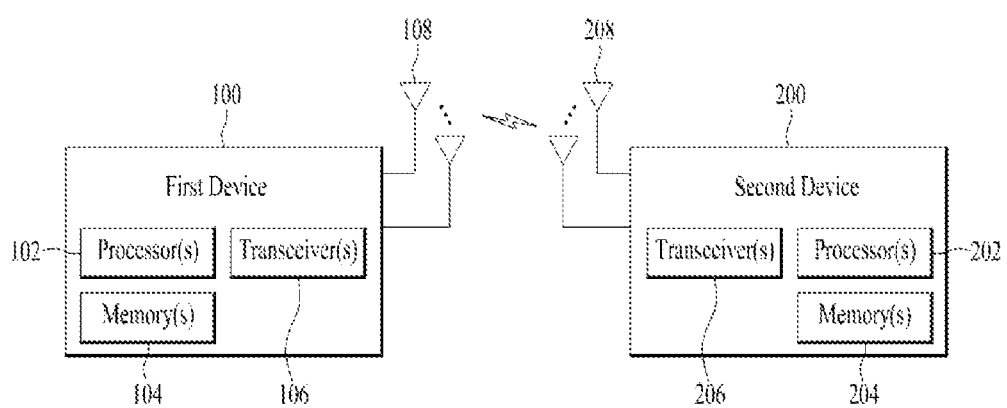
FIG. 23 illustrates wireless devices applicable to the present disclosure.

FIG. 23 illustrates a wireless device applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include the processor(s) 102 and the memory(s) 104, connected to the RF transceiver(s). The memory(s) 104 may include at least one program capable of performing operations related to the embodiments described with reference to FIGS. 11 to 21.

The processor(s) 102 may control the first antenna and the second antenna to receive a first signal from the first RSU and a second signal from the second RSU and calculate a first TDoA, which is a difference in reception time between the first antenna and the second antenna, and a second TDoA, which is a difference in reception time between the first antenna and the second antenna. The processor may calculate a first hyperbola based on the first TDoA and a second hyperbola based on the second TDoA and determine a first offset based on the predetermined distance and the first TDoA and a second offset based on the predetermined distance and the second TDoA. The location of the V2X vehicle may be determined based on an intersection of the first hyperbola to which the first offset is applied and the second hyperbola to which the second offset is applied.

Alternatively, a chipset including the processor(s) 102 and the memory(s) 104 may be configured. In this case, the chipset includes at least one processor, and at least one memory operably connected to the at least one processor and causing, when executed, the at least one processor to perform operations. The operations may include receiving a first signal from a first RSU and a second signal from a second RSU, through a first antenna and a second antenna distributed a predetermined distance apart, measuring a first time difference of arrival (TDoA), which is a difference in reception time of the first signal between the first antenna and the second antenna, and a second TDoA, which is a difference in reception time of the second signal between the first antenna and the second antenna, calculating a first hyperbola based on the first TDoA and a second hyperbola based on the second TDoA, and determining a first offset based on the predetermined distance and the first TDoA and a second offset based on the predetermined distance and the second TDoA. The location of the V2X device may be determined based on an intersection of the first hyperbola to which the first offset is applied and the second hyperbola to which the second offset is applied. The above operations may perform operations for determining the location of the V2X vehicle according to the embodiments described with reference to FIGS. 11 to 21 based on a program included in the memory(s) 104.

Alternatively, a computer readable storage medium including at least one computer program that causes the at least one processor to perform operations is provided. The operations may include receiving a first signal from the first RSU and a second signal from the second RSU, through a first antenna and a second antenna distributed a predetermined distance apart, measuring a first time difference of arrival (TDoA), which is a difference in reception time of the first signal between the first antenna and the second antenna, and a second TDoA, which is a difference in reception time of the second signal between the first antenna and the second antenna, calculating a first hyperbola based on the first TDoA and a second hyperbola based on the second TDoA, and determining a first offset based on the predetermined distance and the first TDoA and a second offset based on the predetermined distance and the second TDoA. The location of the V2X device may be determined based on an intersection of the first hyperbola to which the first offset is applied and the second hyperbola to which the second offset is applied. In addition, the above operations may perform operations for determining the location of the V2X vehicle according to the embodiments described with reference to FIGS. 11 to 21 based on a program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 24:
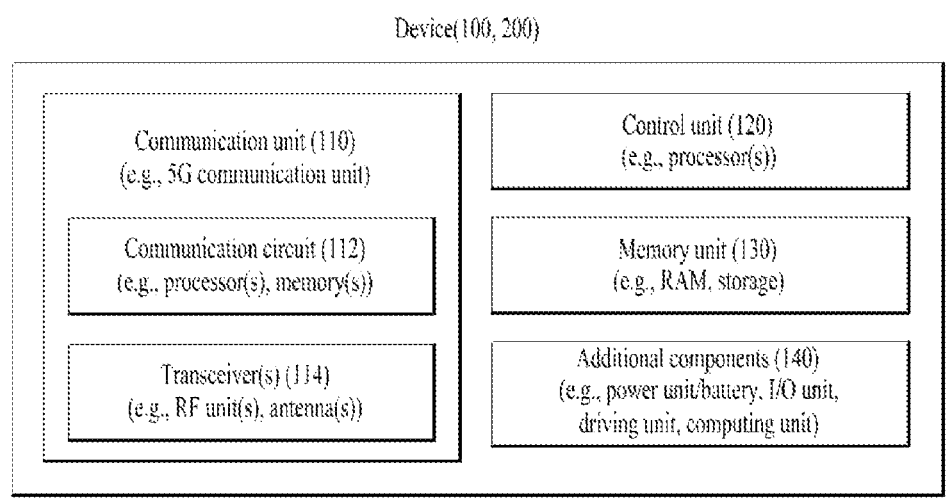
FIG. 24 illustrates another example of a wireless device to which the present disclosure is applied.

FIG. 24 illustrates another example of a wireless device applied to the present disclosure. The wireless device may be implemented in various forms according to a use-case/service (refer to FIG. 22)

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 25:
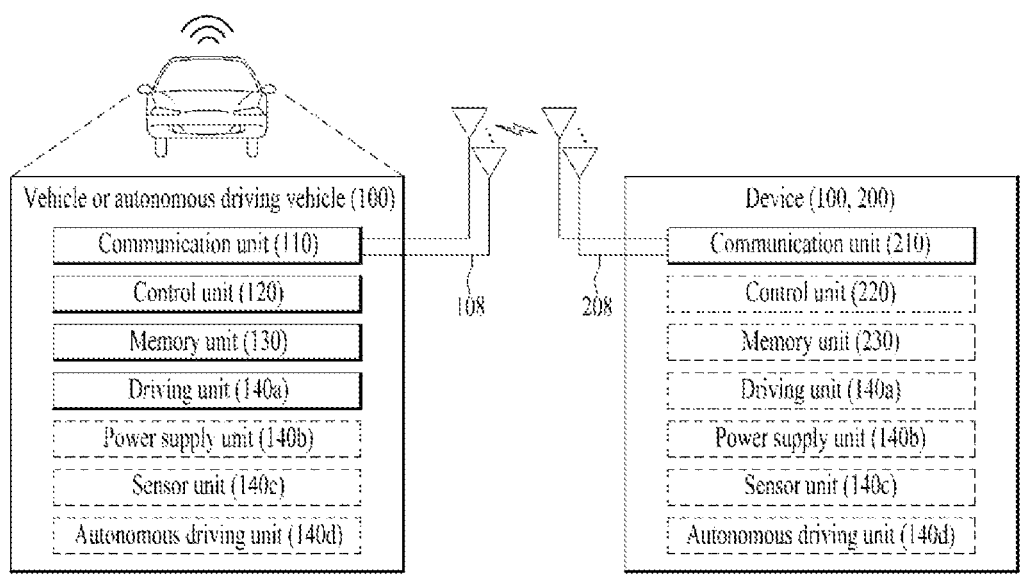
FIG. 25 illustrates a vehicle or an autonomous driving vehicle applied to the present disclosure.

Examples of Vehicles or Autonomous Vehicles to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:
1. A method comprising:
receiving a first signal from a second device;
receiving a second signal from a third device;
calculating a first time difference of arrival (TDoA) related to the first signal using a first antenna and a second antenna of a first device;
calculating a second TDoA related to the second signal using the first antenna and the second antenna of the first device; and determining a position of the first device based on the first TDoA and the second TDoA;

wherein the first signal includes first position information of the second device, wherein the second signal includes second position information of the third device, wherein the first device calculates a first hyperbola based on the first TDoA and the first position information, and calculates a second hyperbola calculated based on the second TDoA and the second position information, wherein the position is determined based on an intersection of the first hyperbola shifted by a first offset and the second hyperbola shifted by a second offset, and wherein the first offset is determined based on the first TDoA and a first distance, and the second offset is determined based on the second TDoA and the first distance.

2. The method of claim 1, wherein the first device calculates a first offset distance obtained by multiplying a propagation speed by the first TDoA and a second offset distance obtained by multiplying the propagation speed by the second TDoA, and wherein the first offset is determined based on a first separation distance obtained by subtracting the first offset distance from the first distance, and the second offset is determined based on a second separation distance obtained by subtracting the second offset distance from the first distance.

3. The method of claim 2, wherein, based on the position of the first device corresponding to a position of the first antenna, the first offset is determined as a value obtained by dividing the first separation distance by 2, based on the first signal being received first at the first antenna among the first antenna and the second antenna.

4. The method of claim 2, wherein, based on the position of the first device corresponding to the position of the first antenna, the first offset is determined as a value obtained by dividing the first separation distance by 2 and then adding the first distance to the divided resultant value, based on the first signal being received first at the second antenna among the first antenna and the second antenna.

5. The method of claim 1, wherein the first position information is the position of a first road side unit (RSU), which is the second device, and the second position information is the position of the second RSU, which is the third device.

6. The method of claim 1, wherein the first hyperbola is related to one hyperbola specified by a forward direction among a plurality of hyperbolas calculated based on the first TDoA and the first position information, and wherein the second hyperbola is related to one hyperbola specified by the forward direction among a plurality of hyperbolas calculated based on the second TDoA and the second position information.

7. The method of claim 6, wherein the first device measures a position change amount from a first time to a second time using an inertial sensor, based on the second signal being received at the second time after the first signal is received at the first time, and wherein the position of a first RSU is moved by the position change amount, and the first hyperbola is calculated based on the moved position of the first RSU.

8. A non-transitory computer readable storage-medium recording a program code for performing the method according to claim 1.

9. A first device comprising:

a first antenna and a second antenna distributed a first distance apart and a processor connected to the first antenna and the second antenna, wherein the processor is configured to receive a second signal from a third device, calculate a first time difference of arrival (TDoA) related to the first signal using the first antenna and the second antenna, calculate a second TDoA related to the second signal using the first antenna and the second antenna, and determine a position of the first device based on the first TDoA and the second TDoA, wherein the first signal includes first position information of a second device, wherein the second signal includes second position information of the third device, wherein the first device calculates a first hyperbola based on the first TDoA and the first position information, and calculates a second hyperbola calculated based on the second TDoA and the second position information, wherein the position is determined based on an intersection of the first hyperbola shifted by a first offset and the second hyperbola shifted by a second offset, and wherein the first offset is determined based on the first TDoA and the first distance, and the second offset is determined based on the second TDoA and the first distance.

10. The first device of claim 9, wherein the processor calculates a first offset distance obtained by multiplying a propagation speed by the first TDoA and a second offset distance obtained by multiplying the propagation speed by the second TDoA, and wherein the first offset is determined based on a first separation distance obtained by subtracting the first offset distance from the first distance, and the second offset is determined based on a second separation distance obtained by subtracting the second offset distance from the first distance.

11. The first device of claim 10, wherein, based on the position of the first device corresponding to a position of the first antenna, the first offset is determined as a value obtained by dividing the first separation distance by 2, based on the first signal being received first at the first antenna among the first antenna and the second antenna.

12. The first device of claim 11, wherein, based on the position of the first device corresponding to the position of the first antenna, the first offset is determined as a value obtained by dividing the first separation distance by 2 and then adding the first distance to the divided resultant value, based on the first signal being received first at the second antenna among the first antenna and the second antenna.

* * * * *